United States Patent
Comparan et al.

(10) Patent No.: US 8,082,420 B2
(45) Date of Patent: Dec. 20, 2011

(54) METHOD AND APPARATUS FOR EXECUTING INSTRUCTIONS

(75) Inventors: Miguel Comparan, Rochester, MN (US); Brent Francis Hilgart, Rochester, MN (US); Brian Lee Koehler, Rochester, MN (US); Eric Oliver Mejdrich, Rochester, MN (US); Adam James Muff, Rochester, MN (US); Alfred Thomas Watson, III, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 11/877,754

(22) Filed: Oct. 24, 2007

(65) Prior Publication Data
US 2009/0113181 A1   Apr. 30, 2009

(51) Int. Cl.
*G06F 9/38* (2006.01)
(52) U.S. Cl. ........................................ 712/215; 712/216
(58) Field of Classification Search .................. 712/215, 712/216
See application file for complete search history.

(56) References Cited

U.S. PATENT DOCUMENTS
2007/0214343 A1 *  9/2007  Lindholm et al. ............ 712/220

OTHER PUBLICATIONS

Mauricio Serrano, Performance Tradeoffs in Multistreamed Superscalar Processors, Dissertation, Univ. of California at Santa Barbara, Mar. 1994.*

* cited by examiner

*Primary Examiner* — William M Treat
(74) *Attorney, Agent, or Firm* — Patterson & Sheridan LLP (57) ABSTRACT

A method and apparatus for executing instructions in a processor are provided. In one embodiment of the invention, the method includes receiving a plurality of instructions. The plurality of instructions includes first instructions in a first thread and second instructions in a second thread. The method further includes forming a common issue group including an instruction of a first instruction type and an instruction of a second instruction type. The method also includes issuing the common issue group to a first execution unit and a second execution unit. The instruction of the first instruction type is issued to the first execution unit and the instruction of the second instruction type is issued to the second execution unit.

14 Claims, 4 Drawing Sheets

METHOD AND APPARATUS FOR EXECUTING INSTRUCTIONS

BACKGROUND OF THE INVENTION

1. Field of the Invention

Embodiments of the present invention generally relate to computer processors and execution of instructions within computer processors.

2. Description of the Related Art

Computers typically include a main memory for storing programs and a processor for executing the programs stored in the main memory. During execution of the programs, the processor may be configured to load instructions for a program into one or more memories which are typically smaller than the main memory, usually referred to as a cache, from which the processor may execute the program instructions.

In some cases, a given processor may be configured to execute multiple threads of execution, referred to as multithreading. Execution of each thread may be performed concurrently and/or sequentially within the processor. Each thread may, for example, be used to perform a task. For example, a plurality of threads may be used to execute an application such as a video game which performs three-dimensional graphics rendering, sound effects, physics simulations, player input/output, and other functions.

To provide the most realistic experience to the video game player, there may be a desire to have each thread perform a given function (e.g., one thread may draw a three-dimensional scene, also referred to as rendering while another thread performs a physics calculation) requiring a certain amount of processing power for a set amount of time. For example, if the processor is being used to render a three-dimensional sequence of an action being performed by a video game player in a video game, there may be a desire to render each picture (referred to as a frame) in the sequence quickly such that the action appears to occur smoothly (e.g., if the action being performed by a video game player is a jump, there may be a desire for the jump to appear smoothly up and down as would a real-life jump).

During execution of multiple threads, there may be a desire to share information such as data and/or instructions between each thread. For example, with respect to the video game example described above, a thread performing a physics calculation may share information with a thread which is rendering a scene so that the rendered scene accurately depicts the results of the physics calculation. In some cases, each executing thread may also be in competition for cache space within the processor. For example, a first thread which loads information into the processor cache may displace information (e.g., send the information back to main memory) which is used by a second thread. If the second thread subsequently attempts to access the displaced information, the second thread may pause execution while the displaced information is retrieved from the main memory, thereby reducing the processing power provided to the second thread.

Thus, there is typically a desire to have one or more threads in a processor collectively executing as many instructions as possible (thereby providing maximum processing power). Where multiple threads are executing in the processor, there is also typically a desire to provide sufficient capability in the processor so that each thread can share information while avoiding contention for memory space within the processor. Accordingly, what are needed are improved methods and apparatuses for executing instructions in a processor.

SUMMARY OF THE INVENTION

The present invention generally provides a method and apparatus for executing instructions in a processor. In one embodiment, the method includes receiving a plurality of instructions. The plurality of instructions includes first instructions in a first thread and second instructions in a second thread. The method further includes forming a common issue group including an instruction of a first instruction type and an instruction of a second instruction type. Forming the common issue group includes adding the instruction of the first type from the first thread to the common issue group if the first thread includes at least one instruction of the first instruction type and adding the instruction of the first type from the second thread to the common issue group if the first thread does not include at least one instruction of the first instruction type. The method also includes issuing the common issue group to a first execution unit and a second execution unit. The instruction of the first instruction type is issued to the first execution unit and the instruction of the second instruction type is issued to the second execution unit. The first execution unit may not be configured to execute any instruction of the second instruction type.

One embodiment of the invention provides a processor. The processor includes a cache, a first execution unit, a second execution unit, and an issue queue configured to receive a plurality of instructions from the cache. The plurality of instructions may include first instructions in a first thread and second instructions in a second thread. The processor further includes issue circuitry. The issue circuitry is configured to form a common issue group including an instruction of a first instruction type and an instruction of a second instruction type. Forming the common issue group includes adding the instruction of the first instruction type from the first thread to the common issue group if the first thread includes at least one instruction of the first instruction type and adding the instruction of the first instruction type from the second thread to the common issue group if the first thread does not include at least one instruction of the first instruction type. The issue circuitry is further configured to issue the common issue group to the first execution unit and the second execution unit. The issue circuitry is configured to issue the instruction of the first instruction type to the first execution unit and issue the instruction of the second instruction type to the second execution unit. The first execution unit may not be configured to execute any instruction of the second instruction type.

In one embodiment, a method of issuing instructions in a common issue group in a multithreading processor is provided. The method includes, for each thread of a plurality of selected threads being executed by the multithreading processor, if the common issue group does not include a scalar instruction, determining if the thread includes the scalar instruction, and if not, adding the scalar instruction from the thread to the common issue group. The method also includes, for each thread of the plurality of selected threads being executed by the multithreading processor, if the common issue group does not include a vector instruction, determining if the thread includes the vector instruction, and if not, adding the vector instruction from the thread to the common issue group. The method further includes issuing the common issue group to a scalar execution unit and a vector execution unit. The scalar instruction is issued to the scalar execution unit and the vector instruction is issued to the vector execution unit. The scalar execution unit may not be configured to execute any vector instruction.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally provides a method and apparatus for executing instructions in a processor. In one embodiment, the method includes receiving a plurality of instructions. The plurality of instructions includes first instructions in a first thread and second instructions in a second thread. The method further includes forming a common issue group including an instruction of a first instruction type and an instruction of a second instruction type. Forming the common issue group includes adding the instruction of the first type from the first thread to the common issue group if the first thread includes at least one instruction of the first instruction type and adding the instruction of the first type from the second thread to the common issue group if the first thread does not include at least one instruction of the first instruction type. The method also includes issuing the common issue group to a first execution unit and a second execution unit. The instruction of the first instruction type is issued to the first execution unit and the instruction of the second instruction type is issued to the second execution unit. The first execution unit may not be configured to execute any instruction of the second instruction type.

Issuing a common issue group including an instruction of a first type and an instruction of a second type may ensure that each of the execution units in the processor core are being utilized to execute instructions in each issue group (thereby increasing utilization of the processing circuitry in the processor core). As described above, the instructions may be retrieved from multiple threads being executed in the processor, thereby increasing the chances that an appropriate instruction for each execution unit is provided in the common issue group. Embodiments may also provide benefits by giving preference in issuing instructions to high priority threads while ensuring that each execution unit is being utilized and by ensuring that there aren't instruction conflicts between instructions in the common issue group and between other instructions being executed in the processor core.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

An Exemplary Computer System

Figure 1A:
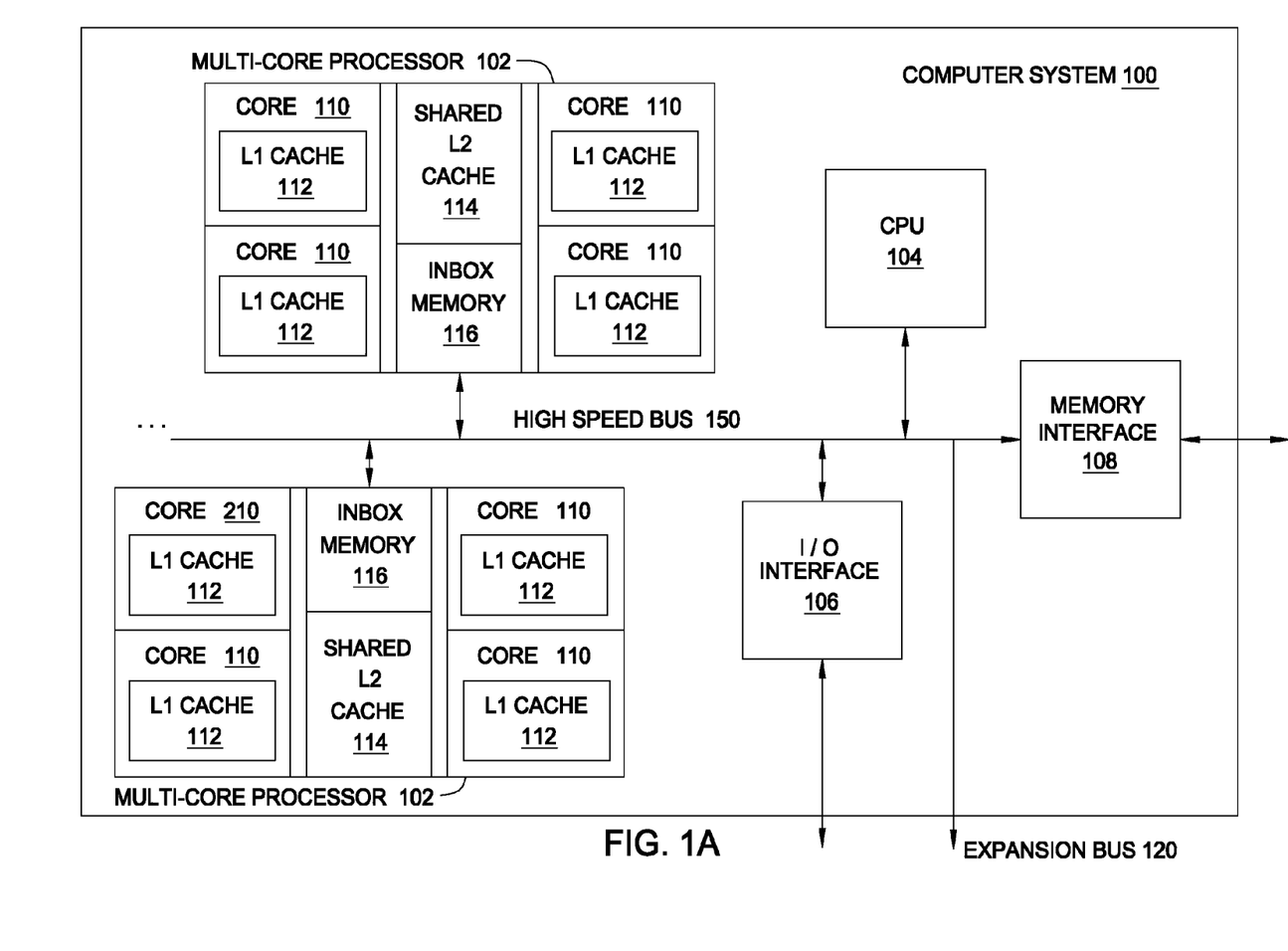
FIGS. 1A-C are block diagrams depicting aspects of a computer system according to one embodiment of the invention.

FIG. 1A is a block diagram depicting the computer system 100 according to one embodiment of the invention. The system 100 may contain a one or more multi-core processors 102. Each multi-core processor 102 may include multiple cores 110 each arranged around a shared level two cache (L2 cache) 114. The shared L2 cache 114 may include a portion of memory, referred to herein as inbox memory 116, which, as described below, may be used to manage memory access for threads being executed by the cores 110 in a multi-core unit 102. Each core 110 may also include a level one cache (L1 cache) 112 which, in some cases, may be used exclusively by that core 110.

In some cases, the system 100 may also include a further central processing unit (CPU) 104 which, in some cases, may provide additional processing functionality. The system 100 may also include an input/output (I/O) interface 106 and a memory interface 108 which may be used to communicate with external I/O device and additional system memory, respectively. Each of the components within the system may communicate across a high speed processor bus 150. The system 100 may also include an expansion bus 120 which may be used to connect the multi-core processor to additional system components. While depicted as separate components of a computer system 100, in some cases, two or more of the items depicted in FIG. 1 may be combined as part of a system on a chip (SOC).

An Exemplary Processor Core

Figure 1B:
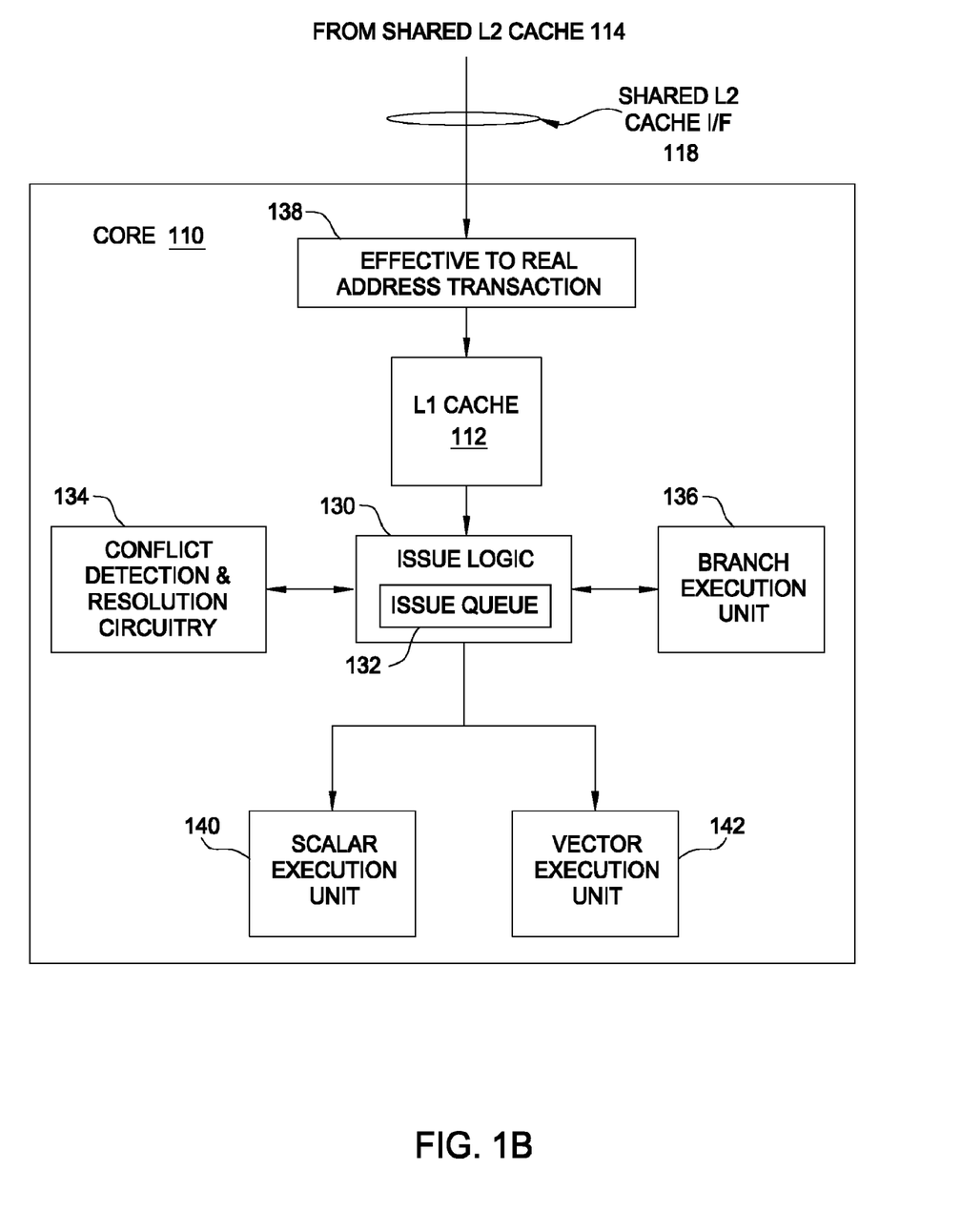

FIG. 1B is a block diagram depicting an exemplary processor core 110 in the multi-core processor 102 according to one embodiment of the invention. In some cases, each processor core 110 in the multi-core processor 102 may be identical or nearly identical. Optionally, one or more cores 110 may differ in functionality from each of the other cores 110. During operation, the core 110 may receive instructions and/or data from the shared L2 cache 114 via a shared L2 cache interface (I/F) 118. In one embodiment of the invention, the received instructions may include instructions from two or more threads being executed by the core 110.

In some cases, the information received by the core 110 may be translated from an effective address to a real address using effective to real address translation circuitry 138. By translating effective addresses to real addresses for the data received from the shared L2 cache 114, each of the threads executing in the core 110 may utilize addresses in a common address space. Because each thread may utilize the real address space, comparison between addresses used by instructions for different threads may be simplified, thereby improving detection of instruction conflicts as described below.

In one embodiment, after effective to real address translation has been performed, the information from the L2 cache 114 may be placed in the L1 cache 112 for the processor core 110. The L1 cache may be a fully associative, set associative, or direct-mapped cache. Embodiments may also be utilized where a separate L1 cache 112 is provided for each thread being executed. From the L1 cache 112, instructions may be placed into issue queue 132. Issue logic 130 may be used to determine which instructions to issue from the issue queue 132. For example, the issue logic may use conflict detection and resolution circuitry 134 to determine if two or more instructions in the issue queue 132 conflict with each other and to schedule such instructions for execution such that no conflict between the instructions occurs.

In some cases, the issue logic may also use information from a branch execution unit 136 to predict which instructions will be issued after a branch instruction (e.g., depending on whether the branch is taken or not taken) and issue instructions according to the prediction. In one embodiment, using the branch execution unit 136 to determine branch instruction outcomes may prevent issued instructions (e.g., for a branch path which is not taken) from being flushed from an execution unit. For example, if the outcome of a branch instruction is not predictable (e.g., if a predictability value for the instruction is below a threshold for predictability), or, optionally, if the outcome of a branch instruction cannot be resolved, then the thread containing the branch instruction may be paused until the branch instruction outcome is resolved. While the thread containing the branch instruction is paused, the issue logic may be configured to continue issuing instructions from other threads in the processor core 110, thereby maintaining a high utilization of the execution units 140, 142 as described above.

In one embodiment of the invention, the processor core 110 may include a plurality of execution units such as a scalar execution unit 140, a vector execution unit 142, and/or other execution units. In some cases, the processor core 110 may include multiple execution units of a single type in addition to multiple execution units of different types. In some cases, each different type of execution unit may be configured to execute a different type of instruction. For example, the scalar execution unit 140 may be configured to execute integer-type instructions while the vector execution unit 142 may be configured to execute vector type instructions. In some cases, a given execution unit may also execute multiple types of instructions.

The execution units 140, 142 may, in some cases, be used to execute multiple instructions simultaneously, and where the execution units 140, 142 are pipelined, each execution unit may separately execute multiple instructions simultaneously. As described below, according to one embodiment of the invention, the issue logic 130 may be configured to provide instructions of the appropriate type to each execution unit 140, 142 such that each execution unit 140, 142 is provided with a steady flow of instructions (thereby increasing processing power of the core 110) while preventing conflicts between instructions being executed by the execution units 140, 142 (thereby increasing processor efficiency).

Issuing Instructions in the Processor

As described above, embodiments of the present invention generally provide a method and apparatus for executing instructions in a processor (e.g., the multi-core processor 102 or CPU 104). During execution of instructions in the processor core 110, a plurality of instructions may be received for execution. The plurality of instructions may include instructions for multiple threads of executions (e.g., first instructions in a first thread and second instructions in a second thread). The instructions may be divided into common issue groups (e.g., issue groups containing multiple instructions which are issued to execution units simultaneously).

As described below, according to one embodiment of the invention, a common issue group may be formed which includes an instruction of a first instruction type and an instruction of a second instruction type. Forming the common issue group may include adding an instruction of the first type from the first thread to the common issue group if the first thread includes one instruction of the first instruction type and adding an instruction of the first type from the second thread to the common issue group if the first thread does not include at least one instruction of the first instruction type. The common issue group may be issued to a first execution unit and a second execution unit such that the instruction of the first instruction type is issued to the first execution unit and the instruction of the second instruction type is issued to the second execution unit.

In one embodiment, issuing a common issue group including an instruction of a first type and an instruction of a second type may ensure that each of the execution units in the processor core are being utilized to execute instructions in each issue group (e.g., in some cases, each execution unit may be provided with an instruction which the execution unit is designed to execute). As described above, the instructions may be retrieved from multiple threads being executed in the processor, thereby increasing the chances that an appropriate instruction for each execution unit will be provided in the common issue group. Embodiments may also provide benefits by giving preference in issuing instructions to high priority threads while ensuring that each execution unit is being utilized and by ensuring that there aren't instruction conflicts between instructions in the common issue group and between other instructions being executed in the processor core.

Figure 1C:
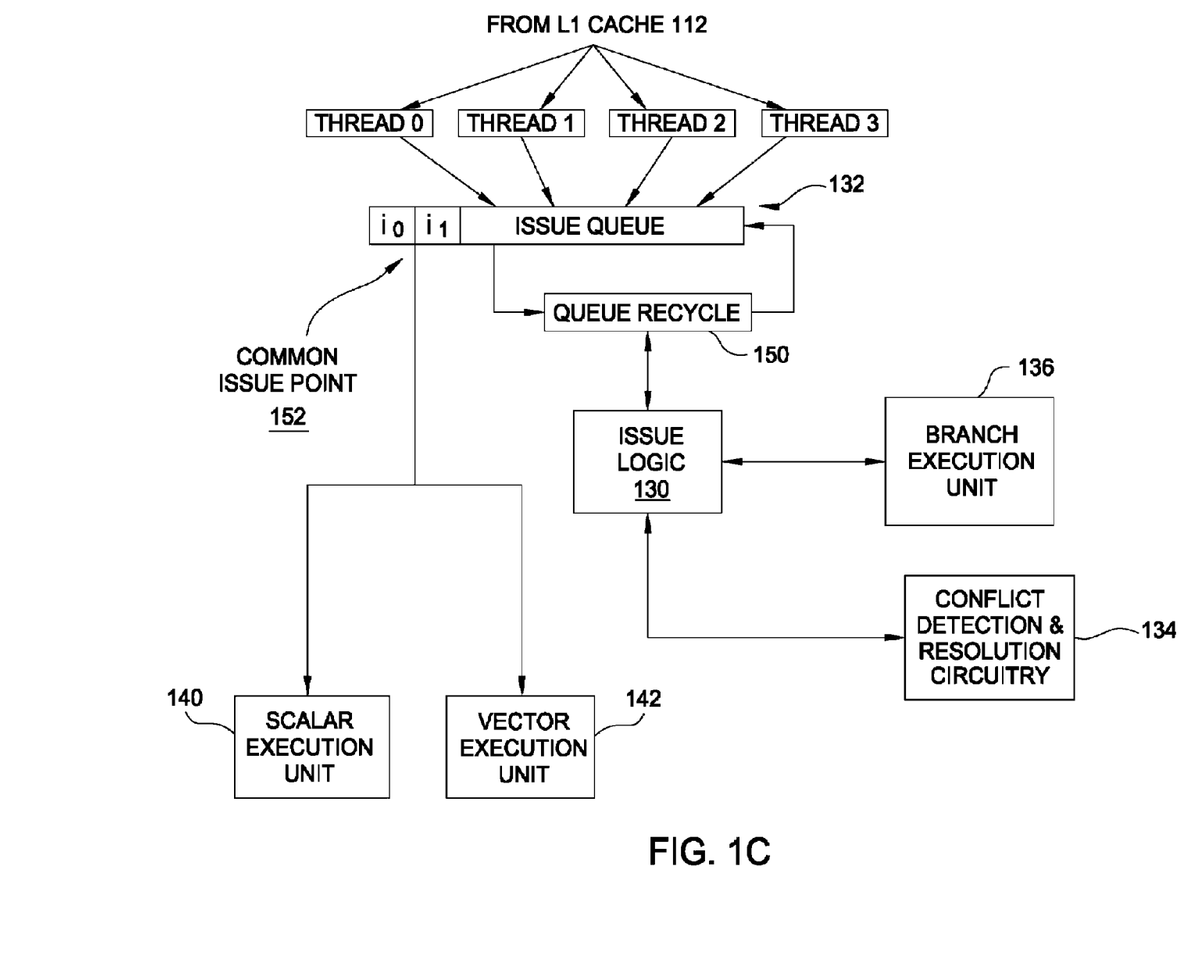

FIG. 1C is a block diagram depicting issue circuitry in the processor core 110 which may be used to issue common issue groups described above according to one embodiment of the invention. As depicted, instructions from multiple threads (e.g., Threads 0-3) may be received from the L1 cache 112 and placed in the issue queue 132. The processor core 110 may be configured to execute each of the threads (concurrently and/or simultaneously) in each of the execution units 140, 142. Thus, the core 110 may be configured to track each thread using a separate program counter. In some cases, the processor core 110 may also be configured to dynamically increase or decrease the number of threads being executed. For example, if the processor core 110 is being under-utilized, the core 110 may begin executing additional threads. Similarly, if the core 110 is being over-utilized, the core 110 may reduce the number of threads being executed.

In one embodiment of the invention, the issue queue 132 may include a common issue point 152 from which instructions from one or more threads in a common issue group are issued to the execution units 140, 142. Issue logic 130 may be configured to form the common issue groups which are issued from the common issue point 152. For example, the issue logic 130 may monitor instructions in the issue queue 130 and use queue recycle circuitry 150 to select which instructions to place in a common issue group and which instructions to keep in the issue queue 132.

Figure 2:
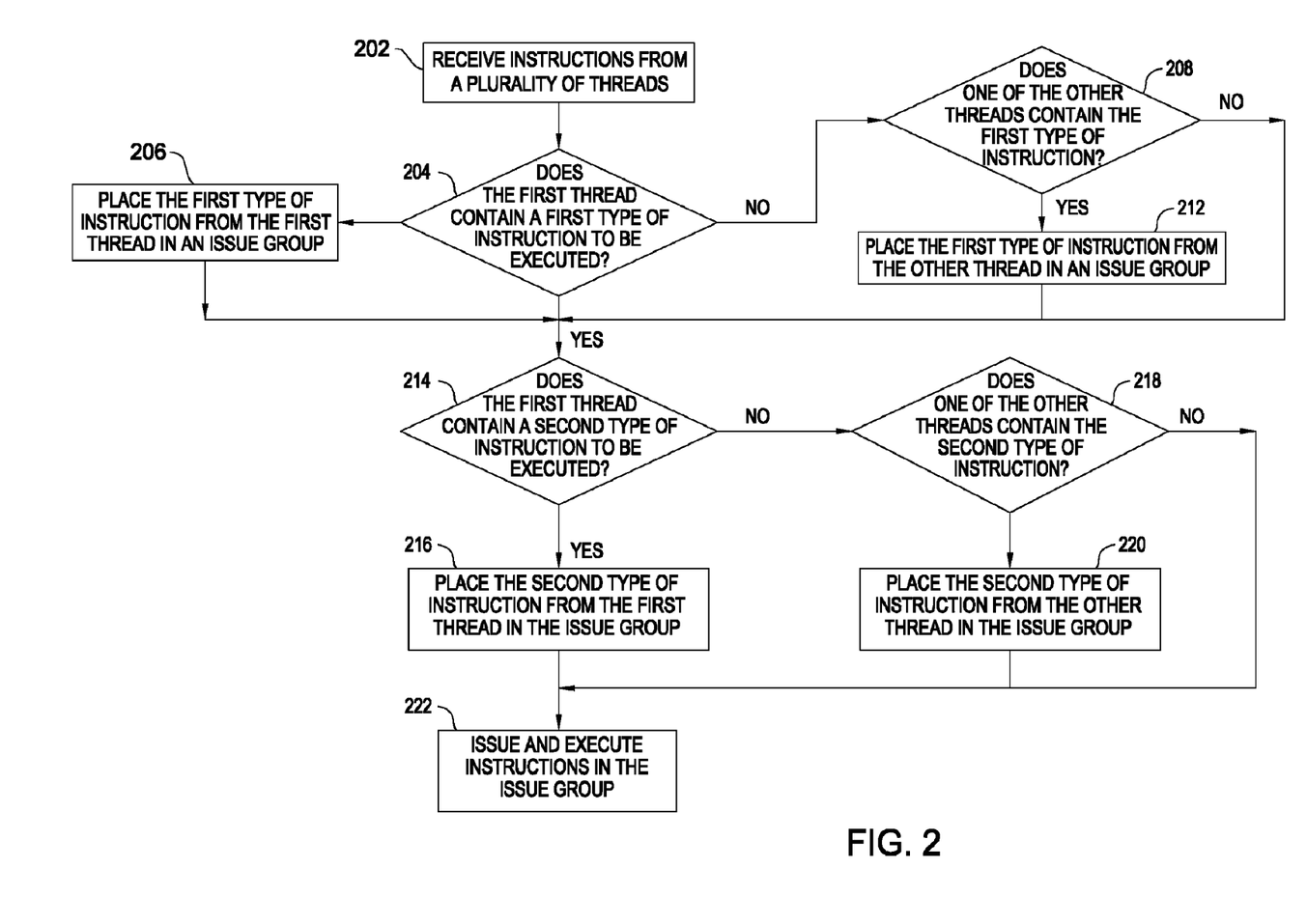
FIG. 2 is a block diagram depicting a method for executing instructions according to one embodiment of the invention.

FIG. 2 is a block diagram depicting a process 200 for issuing instructions (e.g., using issue logic 130) according to one embodiment of the invention. The process 200 may begin at step 202 where instructions are received from a plurality of threads (e.g., Threads 0-3). The instructions may, as described above, be received from the L1 cache 112 an placed in the issue queue 132. Optionally, the instructions may be received from another level of cache. Furthermore, the instructions may be placed in memory other than an issue queue, such as, for example, an instruction buffer or other type of memory.

At step 204, a determination may be made of whether the first thread contains an instruction of a first type to be executed (e.g., a determination may be made of whether the first thread includes a vector instruction). The first thread being checked for the first type of instruction may be any of the threads being executed in the processor core 110. The first thread checked may, for example, be the thread with the highest priority, the next thread in a round-robin scheduling scheme, or any other thread. Where the thread being checked is the highest priority thread or the next thread in a round-robin scheduling scheme, the process 200 may ensure that instructions from the first thread are given preference over other threads when forming the common issue group.

If a determination is made that the first thread contains the first type of instruction, then the first type of instruction from the first thread may be placed in an issue group. If a determination is made that the first thread does not contain the first type of instruction, then a determination may be made at step 208 of whether one of the other threads contains the first type of instruction. If one of the other threads contains the first type of instruction, then the first type of instruction from the other thread may be placed in the issue group at step 220.

At step 214, a determination may be made of whether the received instructions for the first thread include a second type of instruction (e.g., a scalar instruction) to be executed. If so, the second type of instruction from the first thread may be placed in the issue group 216. If the first thread does not contain the second type of instruction, then a determination may be made at step 218 of whether one of the other threads contains the second type of instruction. If one of the other threads contains the second type of instruction, then at step 220 the second type of instruction from the other thread may be placed in the issue group.

At step 222, the instructions in the issue group may be issued and executed. As described above, the instruction of the first type may be issued to a first type of execution unit for execution and the instruction of the second type may be issued to a second type of issue unit for execution. For example, if the first type of instruction is a vector instruction, then the vector instruction may be issued to the vector execution unit 142 for execution. Similarly, if the second type of instruction is a scalar instruction, then the scalar instruction may be issued to the scalar execution unit 140. By issuing an instruction in the issue group to each execution unit 140, 142, each execution unit may be utilized during execution of the issue group, thereby increasing the utilization of processing power in the processor core 110.

As described above, by examining each thread to determine if the thread includes instructions of desired types, the issue logic 130 may form an issue group which contains an instruction which will utilize each execution unit (e.g., the vector execution unit 142) to execute the instructions. In some cases, after examining each thread to determine if the thread contains an appropriate type of instruction, a determination may be made that no thread contains an appropriate instruction. For example, each thread may not include the desired type of instruction. In such cases, an issue group may be issued which does not include a desired type of instruction, although, as described herein, efforts may be made to avoid such a situation.

In one embodiment of the invention, the issue logic 130 may use input from conflict detection and resolution circuitry 134 and the branch execution unit 136 to determine which instructions to place in a given issue group while maximizing the number of instructions being issued to execution units 140, 142 as described above. For example, the conflict detection and resolution circuitry 134 may be used to determine if instructions in an issue group conflict with instructions which have already been issued or other instructions in the issue group. A conflict may result, for example, where a given instruction attempts to load data which is being stored by another instruction (referred to as a load-store conflict). If such a conflict occurs, the load instruction may receive incorrect data (e.g., data which is not current or which is stale) if the store instruction has not completed execution.

As described above, by translating addresses for each instruction in the processor core 110 from effective to real addresses using the effective to real address translation circuitry 138, the conflict detection and resolution circuitry may quickly and efficiently compare addresses for different instructions (even instructions in different threads) to determine if execution of the instructions may result in a conflict. Where a conflict is detected, the instructions may be scheduled for execution so that no conflict results from execution of the instructions. Such scheduling may occur in conjunction with the process 200 described above of maximizing the number of instructions which are provided to each of the execution units 140, 142. For example, if execution of a first type of instruction from the first thread will result in a conflict with another instruction being executed, then the issue logic 130 may examine other threads to determine if the other threads include a first type of instruction which, when executed, will not result in a conflict. In some cases, by detecting such conflicts before instructions are executed and avoiding the conflict through selective scheduling, costly synchronization operations (e.g., using a synchronization instruction) may be avoided.

In some cases, out-of-order execution may be used in an effort to increase the number of instructions in the issue group or the frequency with which multiple instructions can be issued. For example, each thread may typically include instructions which are provided in a program order (created for example, when the program is compiled). Where an instruction of a given type cannot be found in program order (e.g., within a given thread, or within any of the threads being executed), then out-of-order execution may be used to locate the desired type of instruction. Thus, out-of-order execution may be used to further increase the number of instructions in a given issue group being issued to execution units 140, 142. As known to those skilled in the art, out-of-order execution may be used subject to dependency checking of the instructions being issued out-of-order (e.g., to ensure that the outcome of instructions issued out-of-order does not depend on instructions yet to be executed in order).

In addition to out-of-order execution, the processor core 110 may also be configured to allow instructions being executed in an execution unit (e.g., scalar execution unit 140) to be bypassed by other instructions (e.g., out-of-order instructions from the same thread or instructions from another thread). Thus, where instructions in a given thread are stalled (e.g., due to a cache miss which requires information to be requested from higher levels of memory such as the L2 cache 114 or the main memory), other instructions may be issued to the same execution unit 140 and executed, effectively bypassing the stalled instructions.

Where the issue logic 130 forms an issue group from instructions in the issue queue 132, some instructions may not be issued. Where an instruction is not issued, the queue recycle circuitry 150 may maintain the instruction in the issue queue. In some cases, to ensure that a given instruction does not remain in the issue queue for too long, the queue recycle circuitry 150 may be configured to increase the priority of the instruction (or, optionally, increase a value indicative of the instructions age, e.g., the amount of time the instruction has remained in the queue). Once the priority (or age) of a given instruction in the issue queue 132 reaches a threshold value, the issue logic 130 may be configured to place the instruction in an issue group, even if the resulting issue group is suboptimal (e.g., even if the issue group does not contain a maximum number of instructions for issuance to each execution unit 140, 142).

While described above with respect to two execution units, embodiments of the invention may also be used with a plurality of threads and a plurality of execution units. In some cases, one or more of the execution units may be limited to executing certain types of instructions while other execution units may be configured to execute multiple instruction types. In general, embodiments of the invention may be used to provide an issue group wherein the number of execution units receiving an instruction to be executed is optimized. As described above, this may be accomplished by searching through the instructions in each thread being executed by the processor core 110 and determining if the thread includes an appropriate type of instruction which can be added to the issue group.

While the foregoing is directed to embodiments of the present invention, other and further embodiments of the invention may be devised without departing from the basic scope thereof, and the scope thereof is determined by the claims that follow.

What is claimed is:

1. A method of executing instructions in a processor, the method comprising:
    receiving a plurality of instructions, wherein the plurality of instructions includes first instructions in a first thread and second instructions in a second thread;
    forming a common issue group including an instruction of a first instruction type and an instruction of a second instruction type, wherein the instruction of the first instruction type and the instruction of the second instruction type are selected from the first thread and the second thread such that simultaneous execution of the instruction of the first instruction type and the instruction of the second instruction type does not result in a conflict error, and wherein forming the common issue group comprises:
        adding the instruction of the first instruction type from the first thread to the common issue group if the first thread includes at least one instruction of the first instruction type; and
        adding the instruction of the first instruction type from the second thread to the common issue group if the first thread does not include at least one instruction of the first instruction type; and
    issuing the common issue group to a first execution unit and a second execution unit, wherein the instruction of the first instruction type is issued to the first execution unit and wherein the instruction of the second instruction type is issued to the second execution unit, wherein the first execution unit is not configured to execute any instruction of the second instruction type,
    wherein while forming the common issue group, if the instruction of the first instruction type is determined to have a conflict with the instruction of the second instruction type, one of the instruction of the first instruction type or the instruction of the second instruction type is placed in a recycle queue and a priority is assigned to the placed instruction, wherein the placed instruction is added to the common issue group at a later time based on the assigned priority.

2. The method of claim 1, wherein forming the common issue group further comprises:
    adding the instruction of the second instruction type from the first thread to the common issue group if the first thread includes at least one instruction of the second instruction type; and
    adding the instruction of the second instruction type from the second thread to the common issue group if the first thread does not include at least one instruction of the second instruction type.

3. The method of claim 1, wherein a priority of the first thread is higher than a priority of the second thread such that if both the first and second threads have instructions of a given type, an instruction of that type will be selected from the first thread over the instruction of the same type in the second thread.

4. The method of claim 1, wherein the second execution unit is not configured to execute any instruction of the first instruction type.

5. The method of claim 1, wherein instructions in the common issue group are selected from instructions at a front of an issue queue.

6. A processor comprising:
    a cache;
    a first execution unit;
    a second execution unit;
    an issue queue configured to receive a plurality of instructions from the cache, wherein the plurality of instructions includes first instructions in a first thread and second instructions in a second thread; and
    issue circuitry configured to:
        form a common issue group including an instruction of a first instruction type and an instruction of a second instruction type, wherein the issue circuitry is configured such that the instruction of the first instruction type and the instruction of the second instruction type are selected from the first thread and the second thread such that simultaneous execution of the instruction of the first instruction type and the instruction of the second instruction type does not result in a conflict error, and wherein forming the common issue group comprises:
            adding the instruction of the first instruction type from the first thread to the common issue group if the first thread includes at least one instruction of the first instruction type; and
            adding the instruction of the first instruction type from the second thread to the common issue group if the first thread does not include at least one instruction of the first instruction type; and
        issue the common issue group to the first execution unit and the second execution unit, wherein the issue circuitry is configured to issue the instruction of the first instruction type to the first execution unit and issue the instruction of the second instruction type to the second execution unit, wherein the first execution unit is not configured to execute any instruction of the second instruction type,
        wherein while forming the common issue group, if the instruction of the first instruction type is determined to have a conflict with the instruction of the second instruction type, one of the instruction of the first instruction type or the instruction of the second instruction type is placed in a recycle queue and a priority is assigned to the placed instruction, wherein the placed instruction is added to the common issue group at a later time based on the assigned priority.

7. The processor of claim 6, wherein the issue circuitry is configured such that forming the common issue group further comprises:
  adding the instruction of the second instruction type from the first thread to the common issue group if the first thread includes at least one instruction of the second instruction type; and
  adding the instruction of the second instruction type from the second thread to the common issue group if the first thread does not include at least one instruction of the second instruction type.

8. The processor of claim 6, wherein the issue circuitry is configured such that a priority of the first thread is higher than a priority of the second thread such that if both the first and second threads have instructions of a given type, an instruction of that type will be selected from the first thread over the instruction of the same type in the second thread.

9. The processor of claim 6, wherein the second execution unit is not configured to execute any instruction of the first instruction type.

10. The processor of claim 6, wherein the issue circuitry is configured to select instructions in the common issue group from instructions at a front of an issue queue.

11. A method of issuing instructions in a common issue group in a multithreading processor, the method comprising:
  for each thread of a plurality of selected threads being executed by the multithreading processor:
    if the common issue group does not include a scalar instruction, determining if the thread includes the scalar instruction, and if not, adding the scalar instruction from the thread to the common issue group; and
    if the common issue group does not include a vector instruction, determining if the thread includes the vector instruction, and if not, adding the vector instruction from the thread to the common issue group; and
  issuing the common issue group to a scalar execution unit and a vector execution unit, wherein the scalar instruction is issued to the scalar execution unit and wherein the vector instruction is issued to the vector execution unit, wherein the scalar execution unit is not configured to execute any vector instruction and wherein the scalar instruction and the vector instruction are selected from the first thread and the second thread such that simultaneous execution of the scalar instruction and the vector instruction does not result in a conflict error,
  wherein while forming the common issue group, if the vector instruction is determined to have a conflict with the scalar instruction, one of the vector instruction or the scalar instruction is placed in a recycle queue and a priority is assigned to the placed instruction, wherein the placed instruction is added to the common issue group at a later time based on the assigned priority.

12. The method of claim 11, wherein a priority of the first thread is higher than a priority of the second thread such that if both the first and second threads have instructions of a given type, an instruction of that type will be selected from the first thread over the instruction of the same type in the second thread.

13. The method of claim 11, wherein the vector execution unit is not configured to execute any instruction of the scalar instruction type.

14. The method of claim 11, wherein instructions in the common issue group are selected from instructions at a front of an issue queue.

* * * * *